(12) United States Patent
Frazier et al.

(10) Patent No.: US 11,513,072 B2
(45) Date of Patent: Nov. 29, 2022

(54) ABLATION SENSOR WITH OPTICAL MEASUREMENT

(71) Applicant: Raytheon Company, Waltham, MA (US)

(72) Inventors: Gary A. Frazier, McKinney, TX (US); John J. Coogan, Sterling, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/199,604

(22) Filed: Mar. 12, 2021

(65) Prior Publication Data
US 2022/0291125 A1    Sep. 15, 2022

(51) Int. Cl.
*G01N 21/55* (2014.01)
*G01B 11/06* (2006.01)
(Continued)

(52) U.S. Cl.
CPC ............. *G01N 21/55* (2013.01); *B64C 30/00* (2013.01); *B64F 5/60* (2017.01); *G01B 11/0633* (2013.01)

(58) Field of Classification Search
CPC ......... G01N 21/718; G01N 2201/1296; G01N 2001/045; G01N 33/6848; G01N 1/04; G01N 2458/15; G01N 27/3272; G01N 21/65; G01N 33/6851; G01N 1/22; G01N 1/28; G01N 1/4022; G01N 21/68; G01N 2560/00; G01N 27/4071; G01N 15/1012; G01N 2009/004; G01N 2015/0065; G01N 2015/1018; G01N 2021/6439;
(Continued)

(56) References Cited

U.S. PATENT DOCUMENTS

| 4,229,066 A | 10/1980 | Rancourt et al. |
| 5,268,217 A | 12/1993 | Kimock et al. |

(Continued)

FOREIGN PATENT DOCUMENTS

| CN | 102449430 A | * 5/2012 | ......... B05C 11/1005 |
| CN | 105973173 A | * 9/2016 | ........... G01B 11/303 |

(Continued)

OTHER PUBLICATIONS

The pending claims of corresponding U.S. Appl. No. 17/199,602.
(Continued)

*Primary Examiner* — Michael P Stafira
(74) *Attorney, Agent, or Firm* — Renner, Otto, Boisselle & Sklar, LLP

(57) ABSTRACT

A real-time ablation sensor uses an optical detector, such as a spectrometer or radiometer, to detect ablation of a material, for example by detecting a signal indicative of ablation of the material, which may be an engineered material. The optical detector may detect reflected light, either from the material being ablated, or from products of the ablation, such as in the vicinity of the material being ablated. A light source may be used to provide light that is reflected by the material and/or the ablation products, with the reflected light received by the detector. The light may be of a selected wavelength or wavelengths, with the selection made in combination with the selection/configuration of the material to be ablated, and/or the selection/configuration of the optical detector.

17 Claims, 6 Drawing Sheets

(51) Int. Cl.
 B64F 5/60 (2017.01)
 B64C 30/00 (2006.01)
(58) Field of Classification Search
 CPC ....... G01N 2021/655; G01N 2021/656; G01N 2021/8416; G01N 21/64; G01N 21/6428; G01N 21/6456; G01N 21/6458; G01N 21/73; G01N 27/18; G01N 27/3274; G01N 27/407; G01N 27/417; G01N 27/4175; G01N 3/22; G01N 3/32; G01N 33/0027; G01N 33/48771; G01N 33/532; G01N 33/543; G01N 33/583; G01N 15/1031; G01N 2015/1006; G01N 27/07; G01N 27/64; G01N 29/04; G01N 29/2418; G01N 29/28; G01N 35/00732; G01B 11/165; G01B 11/0608; G01B 11/0616; G01B 11/0625; G01B 11/24; G01B 11/28
 See application file for complete search history.

(56) References Cited

U.S. PATENT DOCUMENTS

| | | | |
|---|---|---|---|
| 5,457,471 A | 10/1995 | Epperson, Jr. | |
| 6,019,755 A | 2/2000 | Steinert | |
| 6,261,152 B1* | 7/2001 | Aiyer | B24B 37/013 |
| | | | 451/6 |
| 6,273,362 B1 | 8/2001 | Fisch et al. | |
| 8,199,321 B2* | 6/2012 | Yoo | B23K 26/03 |
| | | | 356/326 |
| 10,138,159 B2 | 11/2018 | Ding et al. | |
| 10,254,445 B2 | 4/2019 | Khan et al. | |
| 10,422,928 B2 | 9/2019 | Khan et al. | |
| 10,442,549 B2 | 10/2019 | Bimanand et al. | |
| 10,816,703 B2 | 10/2020 | DeCoux | |
| 10,897,028 B2 | 1/2021 | Kan et al. | |
| 11,085,882 B1* | 8/2021 | Bol'shakov | G01N 21/718 |
| 11,112,672 B2 | 9/2021 | Hosseini et al. | |
| 11,261,128 B2 | 3/2022 | Lee et al. | |
| 2005/0026085 A1 | 2/2005 | Myung | |
| 2005/0036135 A1* | 2/2005 | Earthman | G01N 21/4738 |
| | | | 356/237.1 |
| 2007/0296966 A1* | 12/2007 | Benicewicz | G01N 21/718 |
| | | | 356/318 |
| 2012/0000893 A1* | 1/2012 | Broude | B23K 26/032 |
| | | | 219/121.68 |
| 2012/0021539 A1* | 1/2012 | Allenic | G01N 21/8422 |
| | | | 324/501 |
| 2013/0059499 A1 | 3/2013 | Benvegnu et al. | |
| 2015/0346089 A1* | 12/2015 | Ishikawa | G01N 21/43 |
| | | | 356/128 |
| 2019/0285785 A1 | 9/2019 | Ockenfuss et al. | |
| 2020/0233131 A1 | 7/2020 | Banaei | |
| 2020/0390606 A1 | 12/2020 | Magnusson | |
| 2021/0011203 A1 | 1/2021 | Sun et al. | |
| 2021/0263201 A1 | 8/2021 | Nguyen | |

FOREIGN PATENT DOCUMENTS

| | | | | |
|---|---|---|---|---|
| CN | 105973871 A | * | 9/2016 | ........... G01N 21/718 |
| CN | 108072672 A | * | 5/2018 | ............. G01B 11/24 |
| CN | 113740319 A | * | 12/2021 | |
| DE | 18 09 459 A1 | | 6/1970 | |
| DE | 102016109303 A1 | * | 11/2017 | ......... G01N 21/6458 |
| GB | 2 225 449 A | | 3/1990 | |
| JP | H08 55991 A | | 2/1996 | |
| JP | 2009 107484 A | | 5/2009 | |
| WO | WO-2020163963 A1 | * | 8/2020 | ............. B23K 26/03 |
| WO | 2020/256946 A1 | | 12/2020 | |

OTHER PUBLICATIONS

Tilsch M et al: "Optical interference coatings design contest 2007: triple bandpass filter and nonpolarizing beam splitter", Applied Optics, Optical Society of America, Washington, DC, us, vol. 47, No. 13, May 1, 2008 (May 1, 2008), pp. C55-C69, XP001514417, ISSN: 0003-6935, DOI: 10.1364/A0.47.000C55 p. C66, left-hand column.
International Search Report and Written Opinion dated Jun. 1, 2022 in corresponding International Application No. PCT/US2020/018638.
International Search Report and Written Opinion dated May 24, 2022 in corresponding International Application No. PCT/US2020/018640.

* cited by examiner

ABLATION SENSOR WITH OPTICAL MEASUREMENT

FIELD OF THE INVENTION

The invention is in the field of measurement devices for ablation and wear.

DESCRIPTION OF THE RELATED ART

Hypersonic flow is a harsh environment, one that can cause damage to optical windows, and coatings for optical windows. The damage can be mechanical, such as by erosion or ablation, chemical (due to ionization of the flow past a hypersonic vehicle that is incident upon the window), and/or thermal (from high heat).

In this and other ablative environments there is a general need to monitor and/or measure ablation.

SUMMARY OF THE INVENTION

An ablation sensor uses reflected light to monitor ablation.

According to an aspect of the invention, an ablation sensor includes: a material subject to ablation; and an optical detector operatively coupled to the material, wherein the optical detector is configured to detect ablation of the material.

According to an embodiment of any paragraph(s) of this summary, the material to be ablated may be an engineered material.

According to an embodiment of any paragraph(s) of this summary, the material to be ablated may be a material selected to provide a predictable or otherwise desirable response to ablation.

According to an embodiment of any paragraph(s) of this summary, the sensor further includes a light source directed at the material subject to ablation.

According to an embodiment of any paragraph(s) of this summary, the light source is a broadband light source that transmits multiple wavelengths.

According to an embodiment of any paragraph(s) of this summary, the light source is a collimated light source.

According to an embodiment of any paragraph(s) of this summary, the material includes alternating layers of different materials.

According to an embodiment of any paragraph(s) of this summary, the material includes a coating on a substrate.

According to an embodiment of any paragraph(s) of this summary, the coating includes multiple layers of different materials.

According to an embodiment of any paragraph(s) of this summary, the material includes multiple portions of different materials.

According to an embodiment of any paragraph(s) of this summary, the material includes an indicator layer, with ablation reaching the indicator layer detected by the optical detector.

According to an embodiment of any paragraph(s) of this summary, the optical detector detects optical signals reflecting from the material subject to ablation.

According to an embodiment of any paragraph(s) of this summary, spectral reflectance of the material changes as thickness of the material decreases.

According to an embodiment of any paragraph(s) of this summary, the optical detector includes a spectrum analyzer.

According to an embodiment of any paragraph(s) of this summary, ablation of the material to be ablated changes optical diffraction of the material to be ablated.

According to an embodiment of any paragraph(s) of this summary, the optical detector detects optical signals from ablation products emitted by the material subject to ablation.

According to another aspect of the invention a method of monitoring ablation includes the steps of: directing light from a light source at a material to be ablated; reflecting the light to produce reflected light; measuring the reflected light at an optical detector; and determining ablation of the material from the reflected light received by the optical detector.

According to an embodiment of any paragraph(s) of this summary, the reflecting occurs at the material to be ablated.

According to an embodiment of any paragraph(s) of this summary, the reflecting occurs at least in part at ablation products produced by ablation of the material to be ablated.

According to an embodiment of any paragraph(s) of this summary, the optical detection system is an optical spectrum analyzer.

According to an embodiment of any paragraph(s) of this summary, a reflectance spectrum of the reflected light is used to determine thickness of the material to be ablated.

According to an embodiment of any paragraph(s) of this summary, the material includes an indicator layer.

According to an embodiment of any paragraph(s) of this summary, the determining ablation includes detecting when arrival at or ablation of the indicator layer has occurred.

According to an embodiment of any paragraph(s) of this summary, the monitoring occurs in real time.

According to an embodiment of any paragraph(s) of this summary, the method further includes triggering an external event based on changes in the reflected light received by the optical detector.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A real-time ablation sensor uses an optical detector, such as a spectrometer or radiometer, to detect ablation of a material, for example by detecting a signal indicative of ablation of the material, which may be an engineered material. The optical detector may detect reflected light, either from the material being ablated, or from products of the ablation, such as in the vicinity of the material being ablated. A light source may be used to provide light that is reflected by the material and/or the ablation products, with the reflected light received by the detector. The light may be of a selected wavelength or wavelengths, with the selection made in combination with the selection/configuration of the material to be ablated, and/or the selection/configuration of the optical detector.

Figure 1:
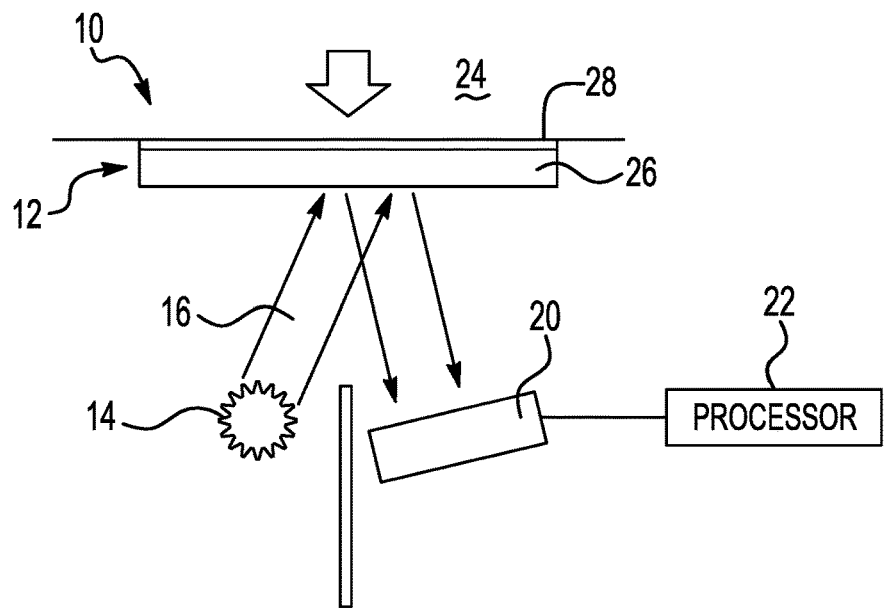
FIG. 1 is a side view of an ablation sensor according to an embodiment of the invention.

FIG. 1 shows an ablation sensor 10 that includes a material to be ablated 12, and a light source 14 that directs suitable light 16 toward the material 12. The light 16 reflects off of the material 12, and/or off of ablation products produced by the material 12. The reflected light 16 is received by an optical detector 20. Changes in the received light may provide a measure of the amount of ablation that is occurring or that has occurred in the material 12. These changes may be picked up using a processor 22 that is coupled to the optical detector 20. The term "optical detector," as used herein, is intended to broadly cover detectors that operate on light and/or signals at any of a wide range of frequencies, including both visible, infrared, and ultraviolet radiation. The processor 22 may perform suitable calculations to make real-time determinations of ablation of the material 12, which may be recorded and/or communicated. The processor 22 and its functions may be embodied in any of a variety of forms, including software and/or hardware, such as (for instance) general-purpose computing devices, integrated circuits, or the like.

The light source 14 and the optical detector 20 may be on the same side of the material 12. For example both the light source 14 and the detector 20 may be on the opposite side of an ablative environment 24 to which one surface of the material 12 is exposed. Although other configurations are possible it is desirable to avoid exposure of the light source 14 and the optical detector 20 to the ablative environment 24.

The material 12 may have any of a variety of configurations, some of which are shown in the particular embodiments described below. The material 12 may have different layers, for example alternating layers with different optical properties, or having one or more trigger or indicator layers that are different from other layers of the material 12 in composition and/or configuration. In addition, different parts of the material 12 may have different composition, for example to have different sensitivities to ablation, and/or to respond to different frequencies of light.

The material 12 may be an engineered material selected for use in the sensor. That is, the material 12 may be selected/configured not (or not just) for resistance to ablation, but alternatively (or additionally) for predictable or otherwise desirable performance while being ablated. That predictable performance can include characterized values for internal reflection. That can be due to the bulk properties of the material, of by changes (purposely placed discontinuities or layering) in the layers material.

The material 12 may have any of a variety of functions, some of which are described in greater detail below. The material 12 may be an optical window, such as for allowing viewing by through the window by an optical sensor, such as for guidance of an aerospace vehicle. The sensor 12 may be any of a variety of optical sensors. The term "optical sensor," as used herein, is intended to broadly cover sensors that operate on light and/or signals at any of a wide range of frequencies, including both visible, infrared, and ultraviolet radiation.

As another alternative, the material 12 may be part of a sensor specifically used for measuring ablation, for example as a wear sensor. The material 12 may be calibrated to indicate the ablation of a window or other surface that is exposed to the ablative environment 24.

The material 12 may include a substrate 26 with a coating 28 on the side of the substrate that is exposed to the ablative environment 24. The substrate 26 may be thicker than the coating 28, and may only function to provide support for the coating 28, with the ablation occurring in the coating 28. The coating 28 may be a single material, or may include multiple materials, for example including multiple layers of different materials.

The material 12 may be selected/configured considering any of a combination of several factors. For example the material 12 may have an optical coating, but the coating may optimized to diagnose corrosion/erosion, as opposed to serving a role to minimize corrosion/erosion. A coating may be configured not to provide consistent optical properties, but instead could contain fiducial layers, configured to provide an especially easy to measure/interpret signals, or react in a known way to a specific erosive process. The coating may be configured not to survive long-term exposure to the exo-atmospheric, atmospheric, or terrestrial environment (or other ablative environment), but instead may be configured to monitor the transient damage that occurs during the transition from, as an example, outer space to earth (and back), or more broadly to exposure to a specific ablative environment.

Many materials can serve as ablation sensor layers. For example, diamond-like coatings are very susceptible to exposure to high temperature oxygen. Excited neutral oxygen, atomic oxygen, and ionized oxygen are all species of oxygen that react strongly with diamond coatings. The reaction produces carbon monoxide and carbon dioxide with vaporized the diamond material. Therefore the diamond layer erodes over exposure time and a measurement of its thickness over time provides a direct measure of the degree of ablation and indirectly the level of reactive oxygen in the environment. Other materials such as magnesium oxide are susceptible to water exposure. Hot water vapor react with magnesium oxide and ablates its surface over time. Polymers such as polyethylene are similarly very susceptible to solvents in liquid and vapor form. Continuous exposure can dissolve the polymer material and this loss of material is detectable by measuring optical or other properties of the polymer that are unique to each polymer.

Non-limiting example materials for the material 12 include $MgO$, $ZrO_2$, $Y_2O_3$, diamond, sapphire, and $Dy_2O_3$.

The ablative environment 24 may be any of a variety of environments that tend to cause ablation of materials. One particular type of ablative environment involves a flow of hot gases past the material 12, and/or flow of gases at high speed. Such situations can occur in hypersonic flight vehicles, for example, or within a jet engine or rocket motor. Such flight vehicles may include aircraft and/or spacecraft (or vehicles configured to operate in both atmosphere and in space). Non-limiting examples of such vehicles include hypersonic airplanes, space planes, and satellites. Flows around hypersonic vehicles may include atmospheric gases heated to the point where the flow includes ionized particles. The ionized particles may interact with the surface material of a vehicle, for example, to erode and/or ablate the material on the vehicle surface.

The light source 14 may be a collimated light source. The light source 14 may produce light of a wavelength or wavelengths suitable for detecting ablation of or from the material 12. The light source 14 may be a broadband light source. The light source 14 may be configured/selected for compatibility with the material 12. The characteristics of the light source 14 may be selected based on the requirements of the platform (vibration, size, and/or weight), or the timescales of the process being monitored, to give some non-limiting examples.

Figure 2:
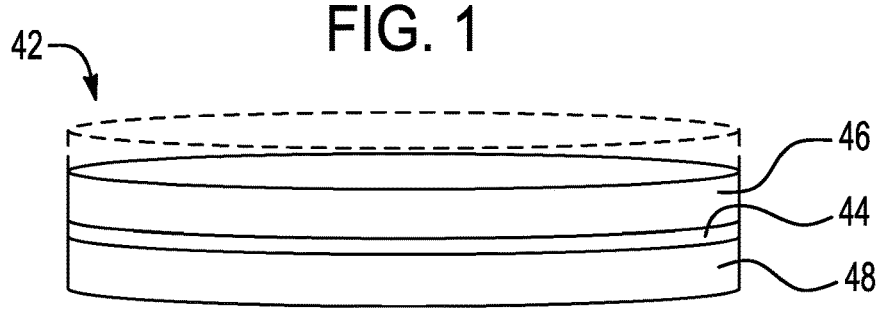
FIG. 2 is an oblique view of a material for an ablation sensor, according to another embodiment of the invention.

FIG. 2 shows a material 42, for a wear or ablation sensor, that has an embedded indicator layer (fiducial layer) 44 that is of a different composition than the layers 46 and 48 above and below the indicator layer 44. The indicator layer 44 may be of uniform composition, or alternatively may itself be made out of multiple stacked layers, the stacking being done in the direction of the ablation. The wear sensor 40 is an example of the material 12 (FIG. 1) that is part of the ablation sensor 10 (FIG. 1). The layers 46 and 48 above and below the indicator layer 44 may themselves be uniform composition of a single material, or may include alternating layers of different materials. The material(s) of the indicator layer 44 may be selected to provide a clear signal, such as with a high signal-to-noise ratio, that ablation has reached the layer 44, serving as a clear indicator that the ablation has reached a predetermined level in the material.

Figures 3, 5:
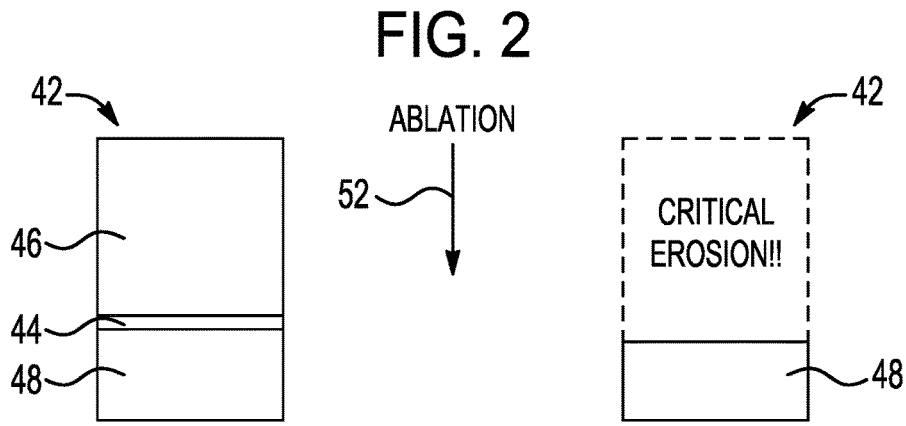
FIG. 3 is a side view of the material of FIG. 2, in an earlier time of ablation.
FIG. 5 is a side view of the material of FIG. 2, in a later time of ablation.
Figure 4:
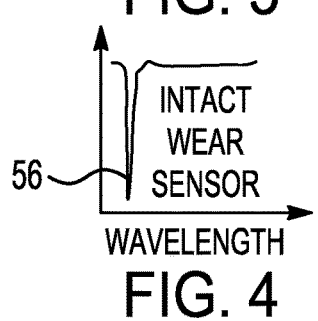
FIG. 4 is a graph of intensity versus wavelength for the material condition of FIG. 3.

With reference in addition to FIGS. 3-6, the optical output received by an optical detector (such as the optical detector 20 shown in FIG. 1). FIG. 3 shows a relatively intact sensor state of the material 42, when relatively little ablation has occurred. The direction of ablation is shown by reference number 52 in FIGS. 3 and 5. FIG. 4 qualitatively shows the optical signal received at the detector 20 in this situation. The optical output includes a spike 56 at a predetermined wavelength, with the reflected optical signal being affected by the presence of the indicator layer 44.

Figure 6:
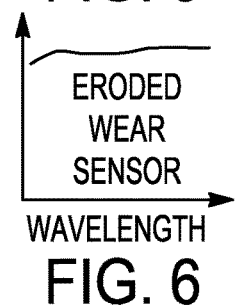
FIG. 6 is a graph of intensity versus wavelength for the material condition of FIG. 5.

FIGS. 5 and 6 show the situation where more ablation has occurred, to the point where the upper material layer 46 and the indicator layer 44 have been ablated away. In FIG. 6 the output spike 56 (FIG. 4) is no longer present, with the wavelength output being more uniform. The absence of the spike 56 serves as an indicator that the ablation has reached the point where at least part of the indicator layer 44 has been removed. This provides a binary indicator of the amount of ablation, that can be used for any of a variety of purposes. The indicator can be used, for example, to indicate the emergence of a possible failure situation, the need for replacement of parts, and/or as an indicator for a change in operating parameters.

FIGS. 4 and 6 show response at specific times as a function of wavelength. Looking at this same data as a function of time, the signal showing the degree of ablation is clearest at the wavelength with a minimum signal in FIG. 4. Monitoring that wavelength over time will generate a clear, high signal-to-noise ratio (S/N) indication when material is ablated to the degree that the fiducial layer is removed. When multiple fiducial layers are used, the system will provide multiple, high S/N, indicators of the degree of ablation.

Figure 7:
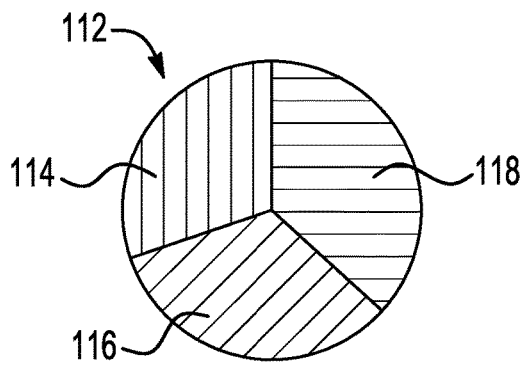
FIG. 7 is a plan view of a material for an ablation sensor, according to still another embodiment of the invention.
Figure 8:
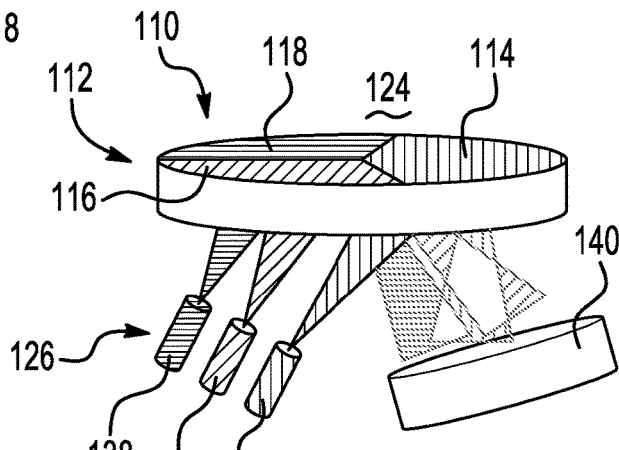
FIG. 8 is a schematic view of an ablation sensor that includes the material of FIG. 7.

FIGS. 7 and 8 show another embodiment, an ablation sensor 110 that includes a multi-part material to be ablated 112. The material 112 in the illustrated embodiment includes three parts 114, 116, and 118, illustrated as different portions of a disc-shaped material. The material parts 114-118 may have different material compositions from one another, in at least some of their materials. A greater or lesser number of parts with different materials, may be used instead.

The parts 114, 116, and 118 may have different sensitivities to ablation from exposure to an ablative environment 124. This may allow for a broader range of determination of ablation, and/or more accurate determination of the amount of ablation. Also, the use of the multiple material parts 114-118 may allow for determinations of the effect of different mechanisms or processes of ablation, since different materials in general are subject to ablation differently. Example ablation processes may be ablation due to ions of various sorts, due to the presence of atomic oxygen, due to the presence of hydroxide (OH), and due to the presence of nitrogen ions. It should be appreciated that passage through different atmospheric compositions and/or conditions may result in different sorts of ablation.

The materials for the different parts 114-118 may be sensitive to different wavelengths of light. Therefore a light source 126 may include different lights 134, 136, and 138, that emit light configured to interact with the different material parts 114, 116, and 118. The wavelengths (or wavelength ranges) for the lights 134-138 may be selected for compatibility with the different materials of the parts 114-118. Alternatively or in addition, the different wavelengths of the lights 134-138 may be chosen to aid in differentiation at an optical detector 140, such as a spectrometer or a radiometer, that receives reflected light from the material parts 114-118. The optical detector 140 may be operatively coupled to a processor 142 for interpreting, characterizing, storing, and/or presenting light received at the optical detector 140.

In an example embodiment, the materials for the parts 114-118 may be uniform materials, or may be combinations of materials. For example some or all of the material parts 114-118 may be uniform materials, may be alternating layers of different materials, and/or may have coatings. The materials for the parts 114-118 may be the same materials as other structures being ablated (for example, an optical window), or may be selected for their relative sensitivities to specific ablative processes, at least in part to examine the effect of certain ablation characteristics or mechanisms.

The material parts 114-118 may all have the same size and shape, as is shown in the illustrated embodiment. Alternatively the parts 114-118 may vary in size, shape, and/or configuration.

Figure 9:
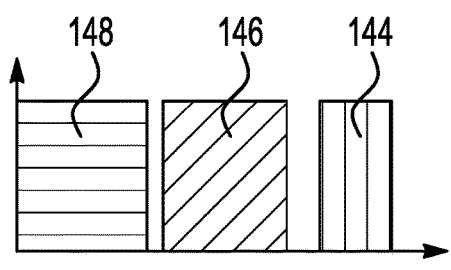
FIG. 9 is an illustration of intensity versus wavelength for the sensor of FIG. 8, qualitatively illustrating output.

FIG. 9 schematically shows output from the optical detector 140 (FIG. 8). Wavelength ranges 144, 146, and 148 displayed in the output shown in FIG. 9 correspond to the respective material parts 114, 116, and 118 (FIG. 7). In FIG. 9 the output levels 144-148 are all shown at the same level, for illustration purposes, but it will be appreciated that the levels 144-148 for the different material parts 114-118 will more likely be different from one another.

Figure 10:
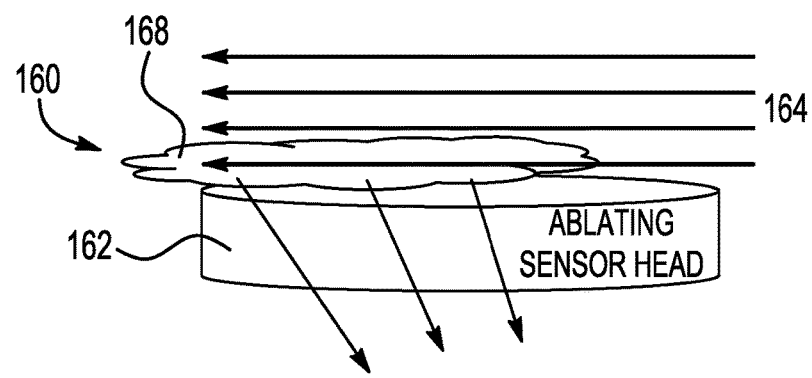
FIG. 10 is a schematic view of an ablation sensor according to yet another embodiment of the invention.
Figure 10:
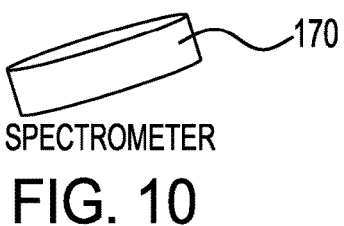
Figure 11:
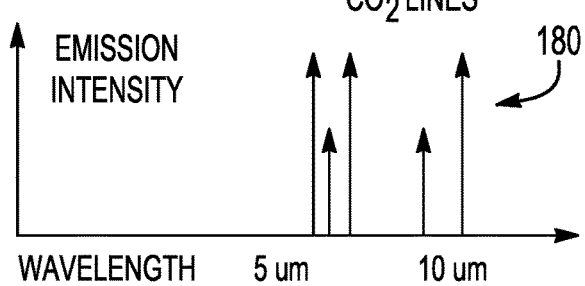
FIG. 11 is a graph of intensity versus wavelength showing output from the ablation sensor of FIG. 10, with spectrum lines corresponding to ablation products.

Turning now to FIGS. 10 and 11, a sensor 160 is shown. The sensor 160 is a boundary layer monitor that functions both as an ablation sensor and an environmental monitor. A material 162 is ablated by an external environment 164, for example a hot gas environment, such as associated with hypersonic flow, in which ambient plasma may be present. The material 162 may constitute an ablating sensor head, producing ablation products 168 when ablated by the environment 164. Light may be reflected off the ablation products 168 and/or aspects of the environment 164, such as plasma, and received at an optical detector 170, such as a spectrometer. The optical detector 170 may also receive reflections from a light source characteristic of the material constituents of the material 162. In such a configuration, the external, ablative, environment 164 functions as an additional layer of the surface—and the optical properties of that external layer (reflective and emissive) are detected and monitored by the internal sensor 170.

FIG. 11 shows spectral output from the optical detector 170 for a specific example material, a window that includes diamond layers. The carbon of the diamond may be ablated by combining with oxygen atoms/ions to produce carbon dioxide ($CO_2$). Spectral lines 180 corresponding to the $CO_2$ may be seen in the output of the spectrometer. Thus the output from the sensor 160 may provide evidence of the ablated material. This may provide information on the chemistry of the ablation that is occurring.

The reflective sensor measures the ablation of a material calibrated to indicate the ablation of a window or other surface of a flight vehicle, such as a hypersonic flight vehicle or a vehicle that undergoes reentry. Real-time monitoring is possible since the optical character (spectral reflectance) of the material changes as the thickness of the material decreases. Such ablation sensor information may be usable to determine the status during flight, and/or to provide mean time to failure (MTTF) predictions for reusable vehicles. The sensor head (such as the material 12 (FIG. 1)) can use the same materials as the window itself, including coatings and substrate.

Spectral analysis of the output from the optical detector can give detailed information regarding the ablation of certain components of surfaces, such as those for optical windows. For example, spectral analysis may provide information on the ablation of the coating of an optical window, to provide information on whether enough of the coating remains to continue use of an optical window for further flights.

In general, optical spectral analysis uses the known values of the optical constants of the material or materials that makeup the ablative and non-ablative materials to estimate the thickness of the materials over time. Each material has an index of optical refraction and an index of optical extinction. These parameters are typically referred to as "n" and "k" in the optical literature. The index of refraction, n, controls of apparent speed of light as it passes through the material and controls the reflection of light as it crosses the boundary between different materials. The index of extinction controls the amount of light absorbed by the material as light traverses the material bulk. There are well known equations that precisely predict the reflection and transmission of light through a layer of material when given the materials that encapsulates the top and bottom of the material layer. These are referred to as the Fresnel coefficients. It is well known that the overall reflectance and transmission of light through one or more layers of material can be precisely predicted once the optical constants and thickness of each material in the composite (coatings+substrate) are known. These constants are routinely determined by optical ellipsometry in the laboratory. Software simulation can then predict how the transmission and reflectance of light changes as the thickness of each material is changed. Generally, the transmission and reflection of light through one or more materials in a composite is very dependent upon the light wavelength and this dependence is in turn strongly dependent upon the thickness of the materials. Therefore, the wavelength-dependent change in the transmission or reflectance spectrum of a composite of materials as a function of thickness can be pre-calculated and stored in a table for comparing real-time spectroscopic measurement of a material or composite to determine the change in thickness of one or more materials in the system. In addition, if the optical constants and initial thicknesses of a composite of materials is known then software can be used to compare the spectrum of the un-ablated materials with the measured spectrum to estimate thickness changes in real time. This is possible since ablation affects one material layer at a time and this guides the software calculations to correctly estimate the thickness change in each material as it is ablated.

The sensor output may be followed in real time, to track the thickness of a coating (for example) or a rate of change of thickness. The data on rate of change of thickness may be integrated to determine an overall change in thickness. The data may be used to characterize the performance of the coating in resisting ablation, and/or may be used in characterizing the ablation occurring at various times throughout a mission, such as a spaceflight. The ablation versus time may be used to determine the most relevant ablation events throughout the mission and/or possible physical mechanisms behind the ablation at different phases of the mission, and/or (for example when the configuration of FIG. 8 is used) to diagnose the critical ablation processes that dominate different phases of the mission.

Figure 12:
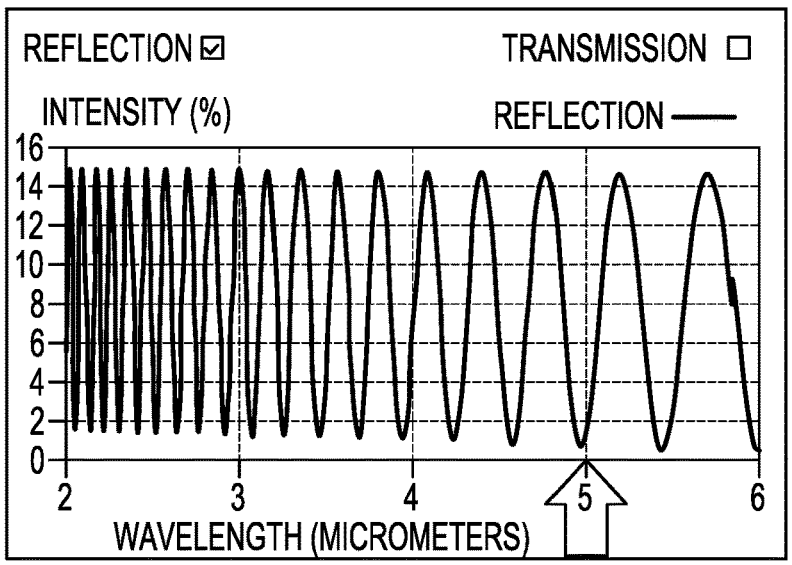
FIG. 12 is an intensity versus wavelength plot for reflected light from a material with a lesser amount of ablation.
Figure 13:
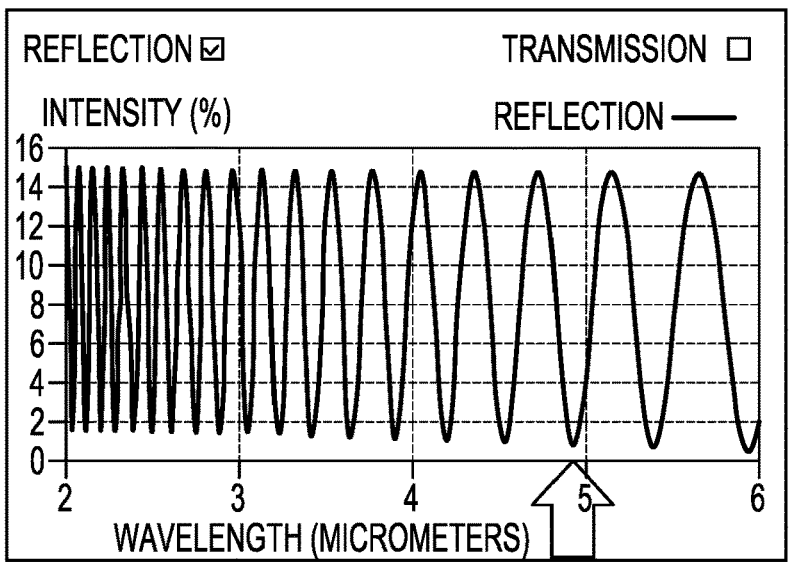
FIG. 13 is an intensity versus wavelength plot for reflected light from the material plotted in FIG. 12, but with a greater amount of ablation.

FIGS. 12 and 13 show one example of a change in reflectance spectrum as a coating thickness changes. Both figures show a coating of magnesium oxide (MgO) over a substrate of zinc sulfide (ZnS). FIG. 12 shows the reflectance spectrum when the coating has a thickness of 16 μm, and FIG. 13 shows the same coating with the coating thickness slight reduced, at 15.8 μm. By monitoring this reflectance spectrum, such as the wavelengths where the local maxima and minima of the intensity are located, even small changes in coating thickness can be detected. With sufficient calibration and data gathering it may be possible to associate a detected reflectance spectrum with a specific coating thickness, for a given combination of materials and light source.

Figure 14:
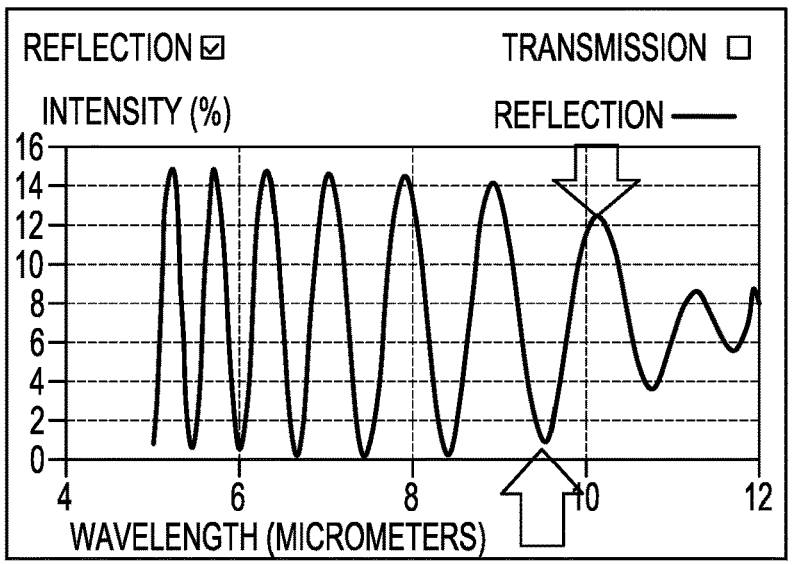
FIG. 14 is an intensity versus wavelength plot for reflected light from a material with a lesser amount of ablation.
Figure 15:
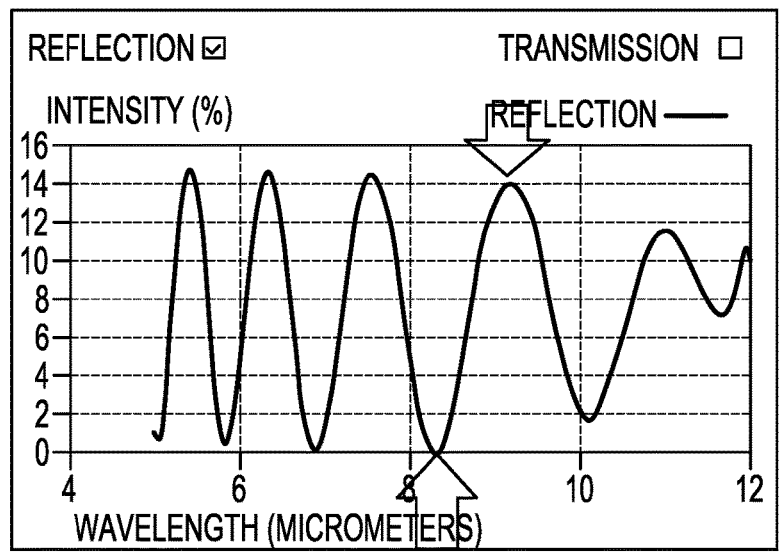
FIG. 15 is an intensity versus wavelength plot for reflected light from the material plotted in FIG. 14, but with a greater amount of ablation.

FIGS. 14 and 15 illustrates reflectance spectrum change over a larger change in coating thickness. FIG. 14 shows the reflectance spectrum for a 16 µm coating of MgO on a substrate of ZnS, and FIG. 15 shows the spectrum when the coating thickness has been reduced to 10 µm. For example the condition illustrated in FIG. 14 may correspond to a new coating, during a first flight of a reusable space vehicle, and the condition illustrated in FIG. 15 may be that of the same (partially-ablated) coating during a tenth flight of the same vehicle. Thus the effect of ablation may be kept track of over multiple flights of a reusable vehicle, allowing determination of the condition of the coating (and more broadly about the effect of ablation), without any need to perform a manual inspection of parts. This may advantageously save time and effort, and avoid needless replacement of parts between flights.

Figure 16:
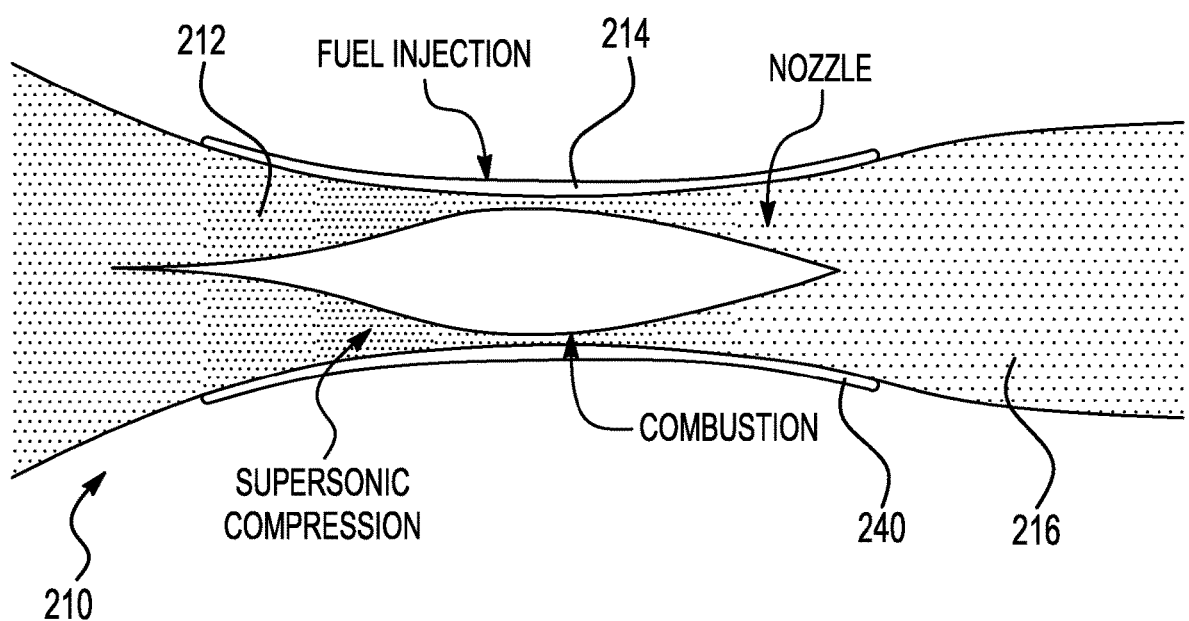
FIG. 16 is a side view of a scramjet engine, with an ablation sensor, according to a further embodiment of the invention.
Figure 17:
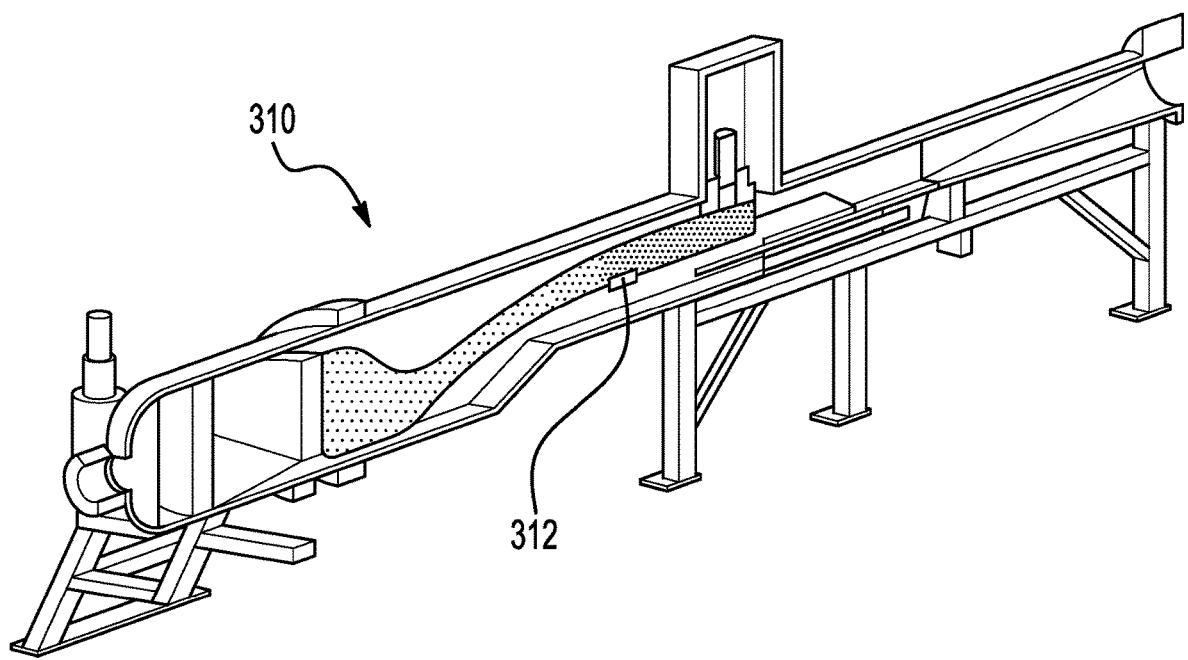
FIG. 17 is a cutaway view of a hypersonic wind tunnel that incorporates an ablation sensor, according to a still further embodiment of the invention.

Although many of the examples above have described use of an ablation sensor in a hypersonic flow environment, more generally ablation sensors such as those described herein may be used for monitoring any surface under physical and/or chemical attack. FIGS. 16 and 17 show examples of other uses of ablation sensors as described herein. FIG. 16 shows a scramjet system 210 that includes an inlet body 212 that provides for supersonic compression, with fuel injection and combustion at a location 214 close to the maximum compression, and supersonic exhaust 216 downstream of the combustion. An ablation sensor 240, such as those described herein, may be placed at an appropriate location in the scramjet system 210, for example where it is exposed to the supersonic exhaust 216. The sensor 240 may provide information on ablation or wear of parts of the system 210.

FIG. 17 shows a hypersonic wind tunnel 310, with an ablation sensor 312 (such as described herein) placed in a high-flow region of the tunnel 310. The sensor 312 may be used to determine ablation (wear) in surfaces of the tunnel 310.

Ablation sensors for applications such as those shown in FIGS. 16 and 17 may be configured to be more accurate, and/or may erode faster, than those of the hypersonic flow and/or space vehicle reentry flow, described earlier. Connected with this, ablation sensors for static and accessible applications may be configured to be replaced as needed.

Figure 18:
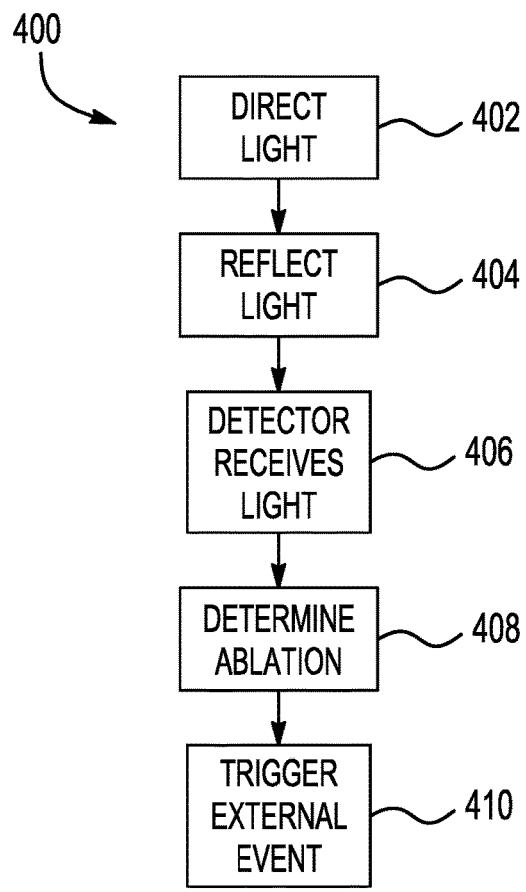
FIG. 18 is a high level flow chart of a method, according to an embodiment of the invention.

FIG. 18 is a high-level of a method 400 for monitoring ablation, using the various sensors described herein. In step 402 light is directed from a light source to a material to be ablated.

In step 404 this light is reflected, producing reflected light. This reflecting may occur from the material to be ablated, and/or from ablation products produced by the ablation.

In step 406 the reflected light is received (measured) at the optical detector, such as a spectrometer. This "measurement" of the reflected light should be construed broadly to include simple receipt of the reflected light, as well as other steps such as processing, abstracting data, storing data, and/or display of data about the received reflected light.

In step 408 ablation is determined from the reflected light received by the optical detector. This may also include other operations, such as processing, storing data, comparing data (such as reflectance spectra) from different times, and examining changes over time of received reflected light.

Finally, in step 410, analysis of the reflected light may trigger an external event based on changes in the reflected light received by the optical detector. This triggering may include a change in operation, a switching out of parts, or communicating a condition involving ablation or the ablative environment.

With reference now to FIGS. 19-22, alternative embodiments are shown in which the ablation sensor layer or layers may be patterned in the form of a diffraction grating consisting of a regular geometric array of islands or grooves patterned across its surface. Optical diffraction from this patterned surface will produce high intensity light called diffraction lobes at very specific angle from the geometric normal to the grating surface. If the grating islands or grooves are patterned with a specific depth into the material then ablation will eventually remove the material that comprises the grating structure and remove the unique grating effect signature from light reflected from or transmitted through the grating. Alternatively, grating islands or grooves may be produced in a thicker material with different ablatable material then used to fill the gaps between the grating structures. By matching the optical index of refraction of the base material to the filler material there will be no or minimal grating effect produce in light reflected from the unablated surface. Subsequent ablation will remove the ablatable filler material thereby creating a diffraction grating in the base material. Detection of the grating signature then indicates when ablation has proceeded to a certain level.

Figure 19:
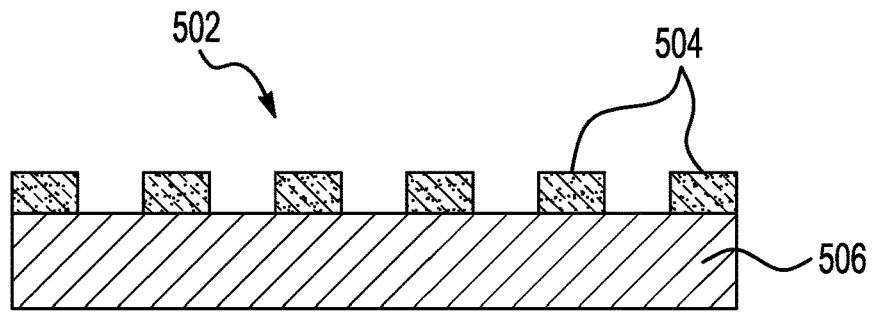
FIG. 19 shows a schematic side view of a material to be ablated, according to another embodiment of the invention.
Figure 20:
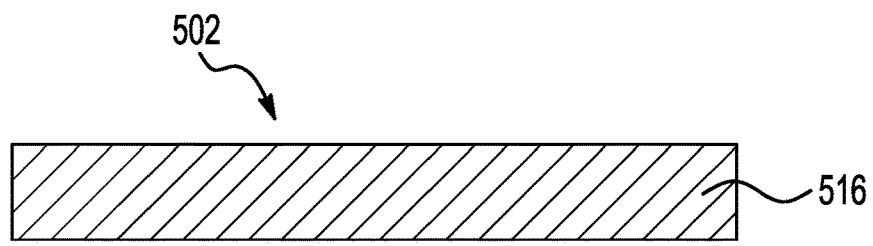
FIG. 20 shows a schematic side view of the material of FIG. 19, after some ablation has occurred.

FIGS. 19 and 20 show one embodiment, in which a material to be ablated 502 includes a patterned ablative material 504 on a substrate 506. While the patterned material 504 is present (FIG. 19) the material 502 acts as a diffraction grating, producing optical diffraction. After the material 504 has been ablated away, as shown in FIG. 20, the material 502 no longer produces optical diffraction. The transition from diffractive behavior to non-diffractive behavior may be detected as a sign of ablation.

Figure 21:
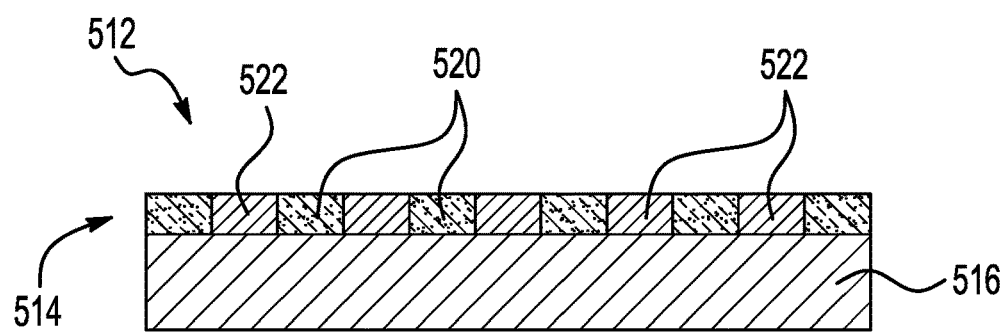
FIG. 21 shows a schematic side view of a material to be ablated, according to yet another embodiment of the invention.
Figure 22:
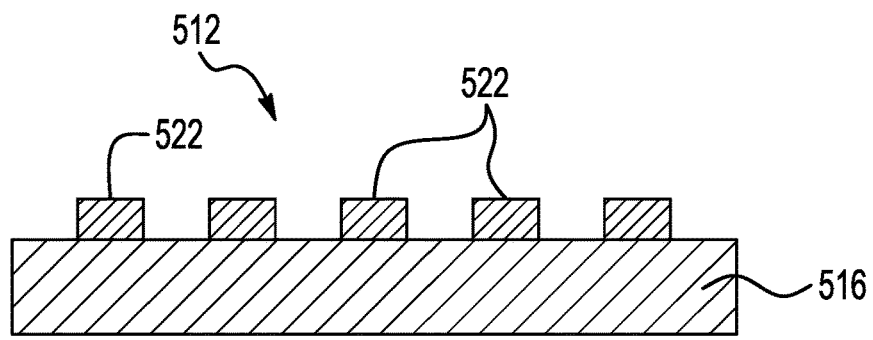
FIG. 22 shows a schematic side view of the material of FIG. 21, after some ablation has occurred.

FIGS. 21 and 22 show another embodiment, in which a material to be ablated 512 includes a layer 514 on a substrate 516. The layer includes index-of-refraction matched materials, on patterned ablative material 520 and non-ablative material 522. Before ablation, as shown in FIG. 21, there is no diffraction, since the index-of-refraction matched materials 520 and 522 act as a uniform layer 514, all with the same index of refraction. However, after the ablative material 520 has been ablated away, only the patterned non-ablative material 522 remains on the substrate 516, as illustrated in FIG. 22. The patterned non-ablative material 522 causes optical diffraction, which in this configuration is a sign of ablation.

It will be appreciated that the optical diffraction materials described above may be used in general in any of the many types of ablation sensors described herein. The patterning to create diffraction may involve any of a variety of known patterns.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An ablation sensor comprising:
   a material subject to an ablation;
   an optical detector operatively coupled to the material, wherein the optical detector is configured to detect ablation of the material; and
   a light source directed at the material subject to ablation, with the light source on an opposite side of the material from a surface of the material where the ablation occurs;
   wherein the material includes an indicator layer, with ablation reaching the indicator layer detected by the optical detector.

2. The ablation sensor of claim 1, wherein the light source is a broadband light source that transmits multiple wavelengths.

3. The ablation sensor of claim 1, wherein the light source is a collimated light source.

4. The ablation sensor of claim 1, wherein the material includes alternating layers of different materials.

5. The ablation sensor of claim 1, wherein the material includes a coating on a substrate.

6. The ablation sensor of claim 5, wherein the coating includes multiple layers of different materials.

7. The ablation sensor of claim 1, wherein the material includes multiple portions that include different materials from one another.

8. The ablation sensor of claim 1, wherein the optical detector detects optical signals reflecting from the material subject to ablation.

9. The ablation sensor of claim 8, wherein spectral reflectance of the material changes as thickness of the material decreases.

10. The ablation sensor of claim 1, wherein ablation of the material to be ablated changes optical diffraction of the material to be ablated.

11. The ablation sensor of claim 1, wherein the optical detector detects optical signals from ablation products emitted by the material subject to ablation.

12. A method of monitoring ablation, the method comprising:
    directing light from a light source at a material to be ablated, wherein the light source is on an opposite side of the material from a surface of the material where the ablation occurs;
    reflecting the light to produce reflected light;
    measuring the reflected light at an optical detector; and
    determining ablation of the material from the reflected light received by the optical detector;
    wherein the material includes an indicator layer; and
    wherein the determining ablation includes detecting when ablation of the indicator layer has occurred.

13. The method of claim 12, wherein the reflecting occurs at the material to be ablated.

14. The method of claim 12, wherein the reflecting occurs at least in part at ablation products produced by ablation of the material to be ablated.

15. The method of claim 12,
    wherein the optical detector is a spectrum analyzer; and
    wherein a reflectance spectrum of the reflected light is used to determine thickness of the material to be ablated.

16. The method of claim 12, wherein the monitoring occurs in real time.

17. The method of claim 12, further comprising triggering an external event based on changes in the reflected light received by the optical detector.

* * * * *